J. NEWMAN.
Evaporating Pan.
No. 36,851. Patented Nov. 4, 1862.
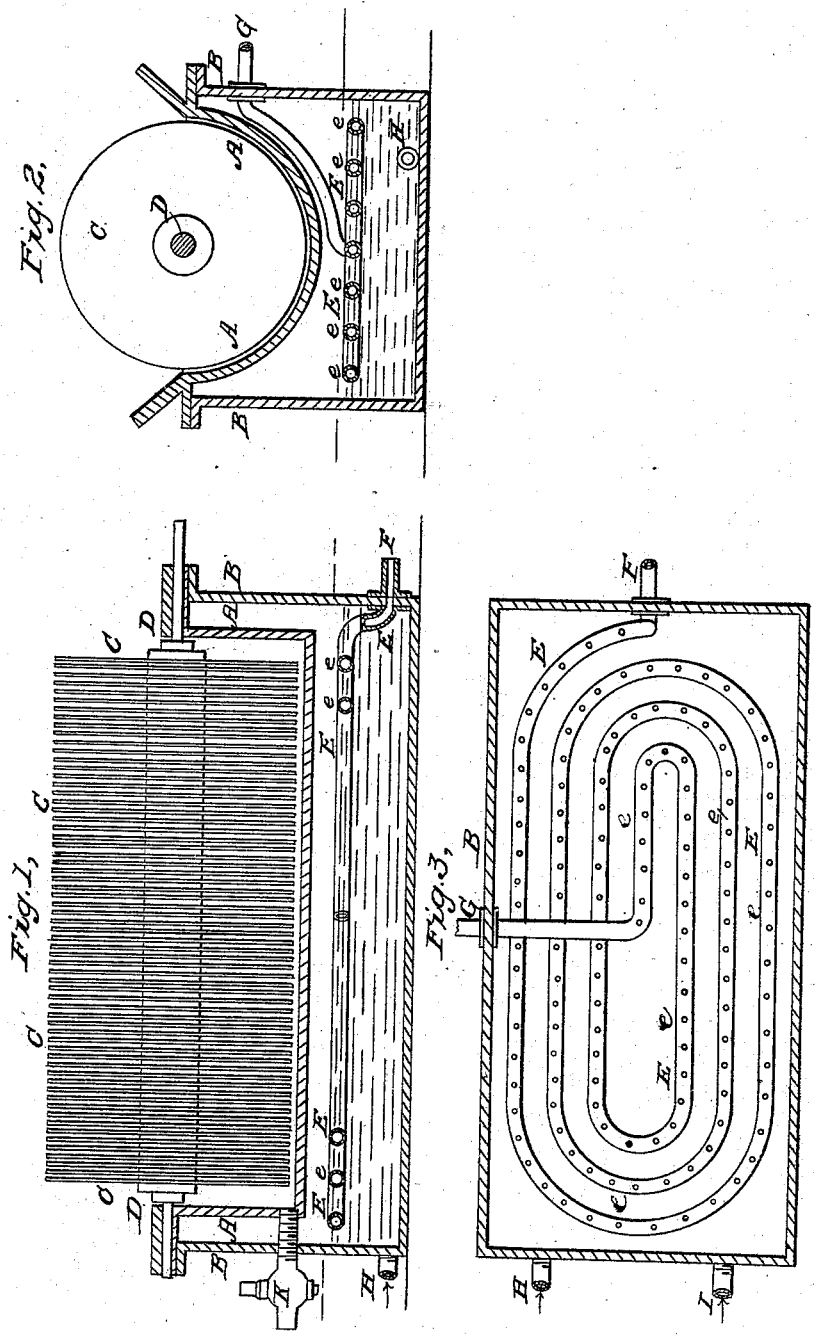

UNITED STATES PATENT OFFICE.

JAMES NEWNAM, OF LONDON, ENGLAND.

IMPROVED EVAPORATOR FOR SACCHARINE JUICES.

Specification forming part of Letters Patent No. 36,851, dated November 4, 1862.

*To all whom it may concern:*

Be it known that I, JAMES NEWNAM, of London, in the United Kingdom of Great Britain and Ireland, have invented a new and useful Improvement in Evaporation of Saccharine Juices and Solutions; and I do hereby declare that the following is a full, clear, and exact description of the same, reference being had to the accompanying drawings, forming part of this specification, in which—

Figures 1 and 2 are vertical sections, at right angles to each other, of an apparatus which I use in carrying out my invention; Fig. 3, a horizontal section of the same below the inner vessel or pan.

Similar letters of reference indicate corresponding parts in the several figures.

The object of my invention is to so employ steam as the heating medium in the evaporation of cane-juice and other saccharine solutions as to provide for the tempering and uniform regulation of the heat.

In carrying out my invention I employ an inner and an outer vessel, the inner vessel containing the juice and having applied within it a series of rotating disks, which take up the juice and expose it to the atmosphere, and the steam being admitted to the space between the inner and outer vessels.

My invention consists in so applying a perforated coil of steam-pipe or its equivalent for the admission of the steam into the said space, in combination with a cold-water injection-pipe and overflow for the circulation of water through the said space, that the steam is delivered into the said space without passing through the water; but the steam-pipe is so far immersed in the water as to enable the steam to be more or less tempered by regulating the circulation of water.

To enable those skilled in the art to make and use my invention, I will proceed to describe its construction and operation.

A is the inner vessel or pan, in which the juice or solution is placed.

B is the outer vessel, forming a steam-jacket.

C C are the rotating disks, secured to the shaft D, and rotating in the juice in the vessel A.

E is a flat coil of steam-pipe, arranged horizontally within the lower part of the vessel B, at a suitable distance from the bottom of A, and having numerous perforations, $e\ e$, in its upper side.

F is an induction-pipe, connected with one end of the pipe E, to supply it with steam from a boiler, and G is an exhaust-pipe, connected with the other end of the pipe E, having an area sufficient to prevent the bursting of the vessels A B.

H is an injection-pipe for the introduction of cold water at a suitable pressure into the vessel B, and I is a pipe for the overflow of water which has been warmed by contact with steam-pipe E. The pipe I is at such a level that it will allow the water to rise in the vessel A to such a height as to nearly cover the horizontal coil E, but never to cover the perforations $e\ e$.

K is a cock for drawing off the contents of the vessel A.

When the apparatus is in operation, the steam issues from the perforations $e\ e$ in the pipe E, and strikes the bottom of and circulates under and around the pan or vessel A, heating the contents thereof to a degree which is indicated by a thermometer suitably applied, and the injection of the cold water at H is at the same time so regulated or controlled by a cock as to cause an overflow at I, to carry off heat from the steam-pipe and reduce the temperature of the steam issuing from $e\ e$, whenever it would otherwise overheat the contents of A. In order to economize heat as much as possible, the steam supplied to the pipe E should be but very little hotter than is necessary to heat the contents of the pan A to the requisite degree, that very little waste may result from the tempering by the water circulating around the said pipe and overflowing at I. The quantity admitted at H will require to be greater or less as the steam supplied is at a higher or lower temperature, and by properly regulating the influx and overflow of water to and from the vessel B the steam may be so tempered as to control the temperature of the juice or solution in the pan A with the greatest nicety and keep it perfectly uniform, which is a great desideratum in the manufacture of sugar, and but imperfectly accomplished by the means heretofore adopted for heating in open pans.

I do not claim the heating of the evaporating-vessel by the introduction of steam below the surface of the water in an outer vessel, as claimed by R. Wright in his patent of 1860, and I regard his invention as differing widely from mine, he heating by the vapor of water, and I by tempered steam; but

What I claim as my invention, and desire to secure by Letters Patent, is—

So applying a perforated steam-pipe E or its equivalent within the space between the vessels A B and in combination with the cold-water injection H and overflow I that the steam is delivered into the said space without entering the water, and is tempered by the circulation of water, substantially as and for the purpose herein specified.

JAMES NEWNAM.

Witnesses:
   R. GAWLEY,
   R. WALLER.